(12) United States Patent
Zerrer et al.

(10) Patent No.: US 6,904,977 B2
(45) Date of Patent: Jun. 14, 2005

(54) PORTABLE HANDHELD WORK APPARATUS

(75) Inventors: Gerhard Zerrer, Korb (DE); Klaus Langhans, Winnenden (DE); Jochen Kramer, Waiblingen (DE); Thomas Stark, Waiblingen (DE); Michael Vögtle, Esslingen (DE); Günter Mayer, Untereisesheim (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 10/687,820

(22) Filed: Oct. 20, 2003

(65) Prior Publication Data

US 2004/0079538 A1 Apr. 29, 2004

(30) Foreign Application Priority Data

Oct. 18, 2002 (DE) .......................................... 102 48 643

(51) Int. Cl.[7] .............................................. A01B 33/00
(52) U.S. Cl. ....................................................... 172/42
(58) Field of Search ................................ 56/12.7, 17.5; 172/17, 18, 41, 42, 43, 54.5, 245, 247, 250; 30/276, 296

(56) References Cited

U.S. PATENT DOCUMENTS

| | | | | |
|---|---|---|---|---|
| 3,773,112 A | * | 11/1973 | Zinck | 172/42 |
| 4,213,504 A | * | 7/1980 | Schneider | 172/25 |
| 4,421,176 A | * | 12/1983 | Tuggle et al. | 172/41 |
| 4,541,492 A | * | 9/1985 | Motruk | 172/41 |
| 5,031,395 A | * | 7/1991 | Ohkanda et al. | 56/236 |
| 5,850,882 A | * | 12/1998 | Link | 172/41 |
| 6,345,489 B1 | * | 2/2002 | Everts et al. | 56/12.7 |

FOREIGN PATENT DOCUMENTS

DE 296 19 177 2/1997

* cited by examiner

*Primary Examiner*—Robert E Pezzuto
(74) *Attorney, Agent, or Firm*—Walter Ottesen

(57) ABSTRACT

A portable handheld work apparatus, such as a motorized cultivator (1) or the like, includes a frame (2) which extends essentially in the longitudinal direction (21) of the work apparatus. A drive motor (3) is fixed at one end (22) of the frame (2) and a work tool is driven by this drive motor. The opposite-lying end (23) includes at least a handle (7, 8) for guiding the work apparatus during the operation thereof. In order to make possible an ergonomic work posture of the operator, the handle (7, 8) lies facing away upwardly from the ground surface (42) in the work position of the motorized work apparatus. The work position is a position in which the work tool lies on the ground surface (42) to be worked.

20 Claims, 8 Drawing Sheets

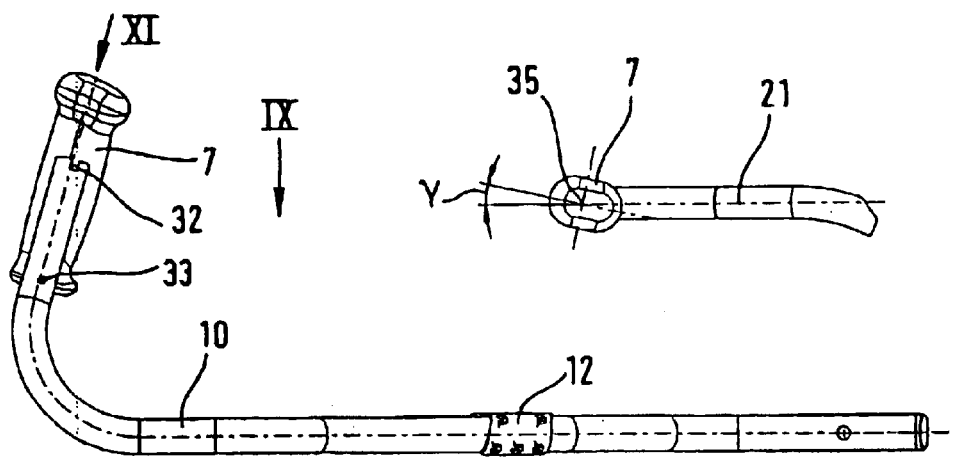
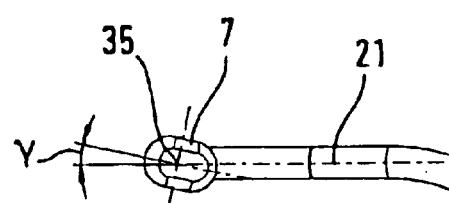
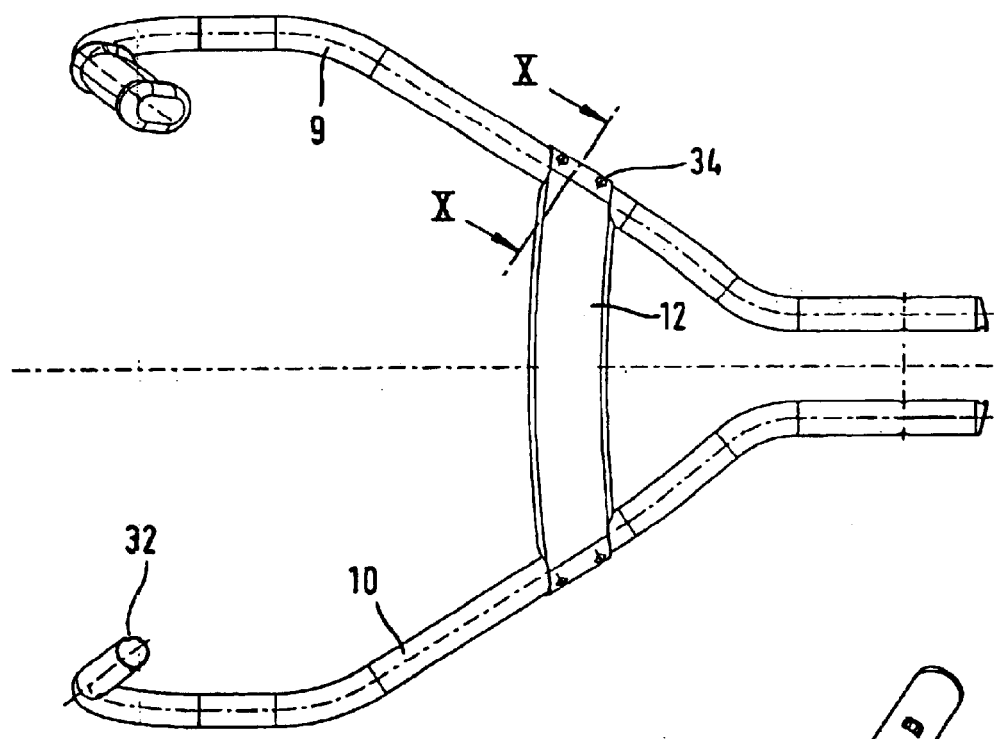
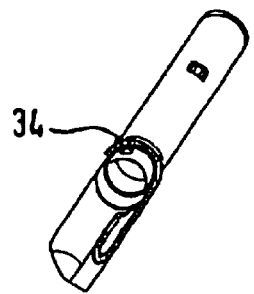

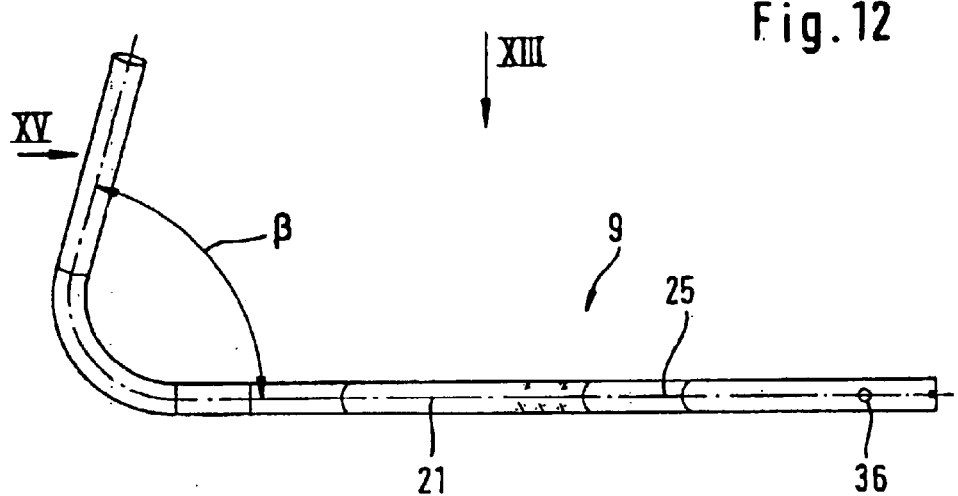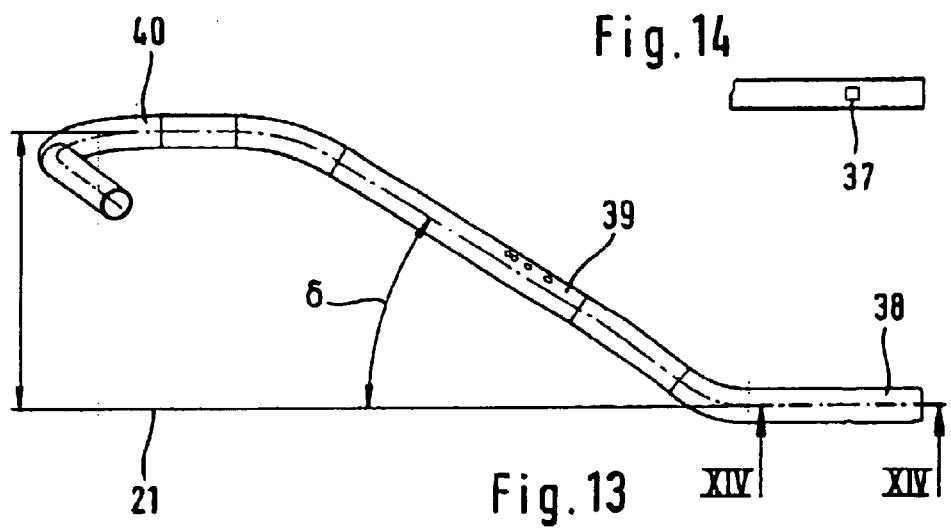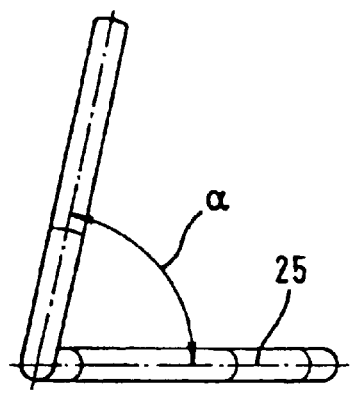

PORTABLE HANDHELD WORK APPARATUS

FIELD OF THE INVENTION

The invention relates to a portable handheld work apparatus such as a motorized cultivator or the like.

BACKGROUND OF THE INVENTION

German patent publication 296 19 177 discloses a portable handheld motorized cultivator which includes a rod having first and second ends. A motor and a hoe blade are mounted on the first end and a handle is mounted at the second end. With the motorized cultivator in the work position, the handle extends in a horizontal direction. From this, there results an ergonomically unfavorable work position.

SUMMARY OF THE INVENTION

It is an object of the invention to provide a work apparatus of the kind described above which can be handled comfortably.

The portable, hand-guided work apparatus of the invention defines a longitudinal axis and includes: a frame extending substantially in the direction of the longitudinal axis; the frame having a first end and a second end lying opposite the first end; an assembly including: a drive motor and a work tool driven by the drive motor and the assembly being fixed on the frame at the first end; a handle unit mounted on the second end for guiding the work apparatus during operation thereof with the work tool being in contact engagement with the surface of the earth to be worked by the work tool thereby defining a work position of the work apparatus; and, the handle unit being configured so as to be directed upwardly and away from the surface when the work apparatus is in the work position thereof.

In the work position of the motorized apparatus, at least one handle is directed upwardly and away from the surface of the ground. For this reason, a favorable work position results for the operator and makes it possible for the operator to work with the work apparatus without fatigue.

A comfortable position of the hands by the operator is achieved when two handles are provided which run upwardly toward each other when the motorized apparatus is in the work position and are inclined in the direction toward the work tool when in this work position. It is especially provided that two handles are arranged on two symmetrically-configured handle tubes. It is practical when the handle tubes enclose an intermediate space open toward the operator. In this way, the operator can step between the handle tubes and the handles come to rest laterally of the body of the operator. This facilitates guiding the work apparatus.

The handle tubes can be folded over toward the frame and are fixed thereon to make possible a simple transport of the work apparatus. Advantageously, the handle tubes are arranged on both sides of the frame in the folded condition. With the folded-over handle tubes, the work apparatus forms a compact package which can be easily transported. At the same time, only a small storage space is needed for the work apparatus when the handle tubes are folded over. For the transport of the work apparatus, it is provided that a rearward carrying handle is arranged on the end of the frame facing toward the handles. It is advantageous to also have a forward carrying handle in a region between the drive motor and the work tool. To make possible a simple transport of the work apparatus, the forward carrying handle acts approximately at the center of gravity of the work apparatus when the handle tubes are folded over. In this way, the work apparatus can be lifted with one hand without the work apparatus tilting so that a danger of injury to the operator is precluded.

Advantageously, the rearward handle has lateral supports in which the handle tubes lie in the folded condition. Because of the support of the handle tubes, it is ensured that the handles do not come in contact with the ground when the work apparatus is set down and damage or a dirtying of the handles is avoided.

In order to achieve a high stability of the work apparatus, the handle tubes are connected by a transverse strut. This strut comes to rest between the rearward carrying handle and the drive motor when the handle tubes are in the folded-over position so that the handle tubes with the frame form a compact package.

The handle tubes define a plane and the handle and this plane conjointly define an angle of 60° to 85° perpendicular to the longitudinal direction of the work apparatus. This angle lies especially between 70° to 80°. For an ergonomic positioning of the hands by the operator, the handles and the plane defined by the handle tube conjointly define, in the longitudinal direction of the work apparatus, an angle of 60° to 100°. This angle lies especially between a range from 70° to 80°.

The frame has a forward support and a rearward support whose connecting line runs at a spacing to the work tool. With this, a good placement of the work apparatus on a floor surface is made possible and, at the same time, the work tool is prevented from lying on the floor or ground when, for example, the motor is started.

BRIEF DESCRIPTION OF THE DRAWINGS

The invention will now be described with reference to the drawings wherein:

FIG. 8 is a side elevation view of the handle brackets;

FIG. 9 is a plan view of the handle brackets in the direction of arrow IX of FIG. 8;

FIG. 10 is a section view taken along line X—X in FIG. 9;

FIG. 11 is a view of one handle in the direction of arrow XI in FIG. 8;

FIG. 12 is a side elevation view of the handle bracket;

FIG. 13 is a plan view in the direction of arrow XIII in FIG. 12;

FIG. 14 is a section view taken along line XIV—XIV in FIG. 13; and,

FIG. 15 is a view in the direction of arrow XV in FIG. 12.

DESCRIPTION OF THE PREFERRED EMBODIMENTS OF THE INVENTION

Figure 1:
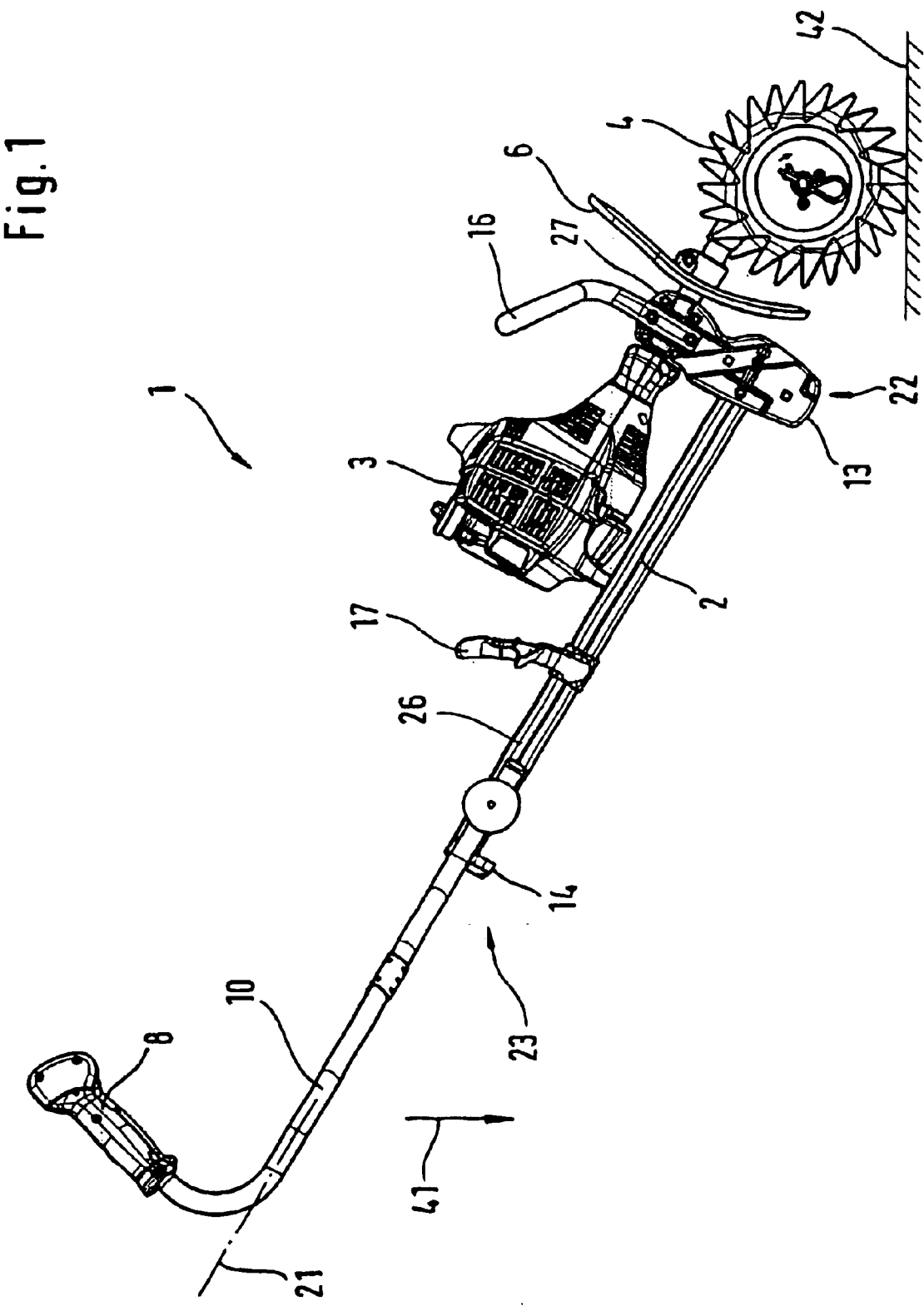
FIG. 1 is a side elevation view of a motorized cultivator in its work position.

A motorized cultivator 1 is shown in its work position in FIG. 1 as an example of a portable handheld work apparatus. In the work position, the longitudinal direction 21 of the motorized cultivator 1 is inclined relative to the effective direction 41 of the gravitational force and is inclined, for example, at an angle between 20° and 80°. The motorized cultivator 1 has a frame 2 which extends essentially in the longitudinal direction 21 of the cultivator 1. The frame 2 is formed by a rod 26 having one end 22 at which a mount 27 is mounted with the mount running transversely to the rod 26. A drive motor 3 is fixed on the mount 27 and the drive shaft of the drive motor passes through this mount and drives the cultivator blade units 4 via a gear case 5 shown in FIG. 3. The blade units 4 lie on the ground surface 42 to be worked. The drive motor 3 is supported on the rod 26 at the end facing away from the mount 27. A protective shield 6 is mounted between the blade units 4 and the mount 27 which prevents earth, which is loosened by the blade units 4, from being flung in a direction toward the drive motor 3, that is, toward the operator. A forward handle 16 is arranged on the mount 27. The forward handle 16 is not configured as a closed bracket but has a hook-like shape. The section 28 of the forward handle 16 is arranged offset in the direction toward the drive motor 3 in the longitudinal direction 21 of the cultivator 1.

Figure 3:
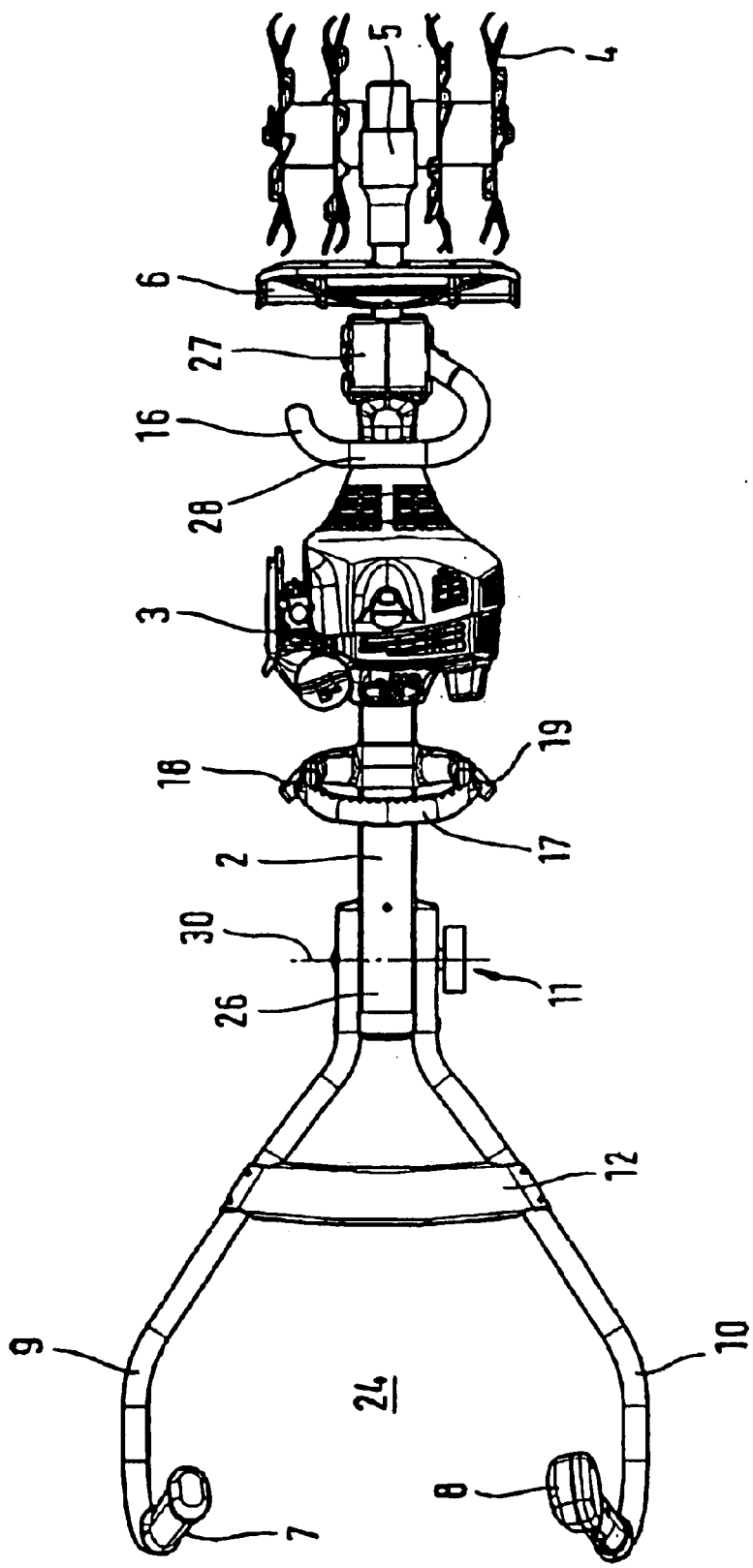
FIG. 3 is a plan view in the direction of arrow III of FIG. 2.
Figure 4:
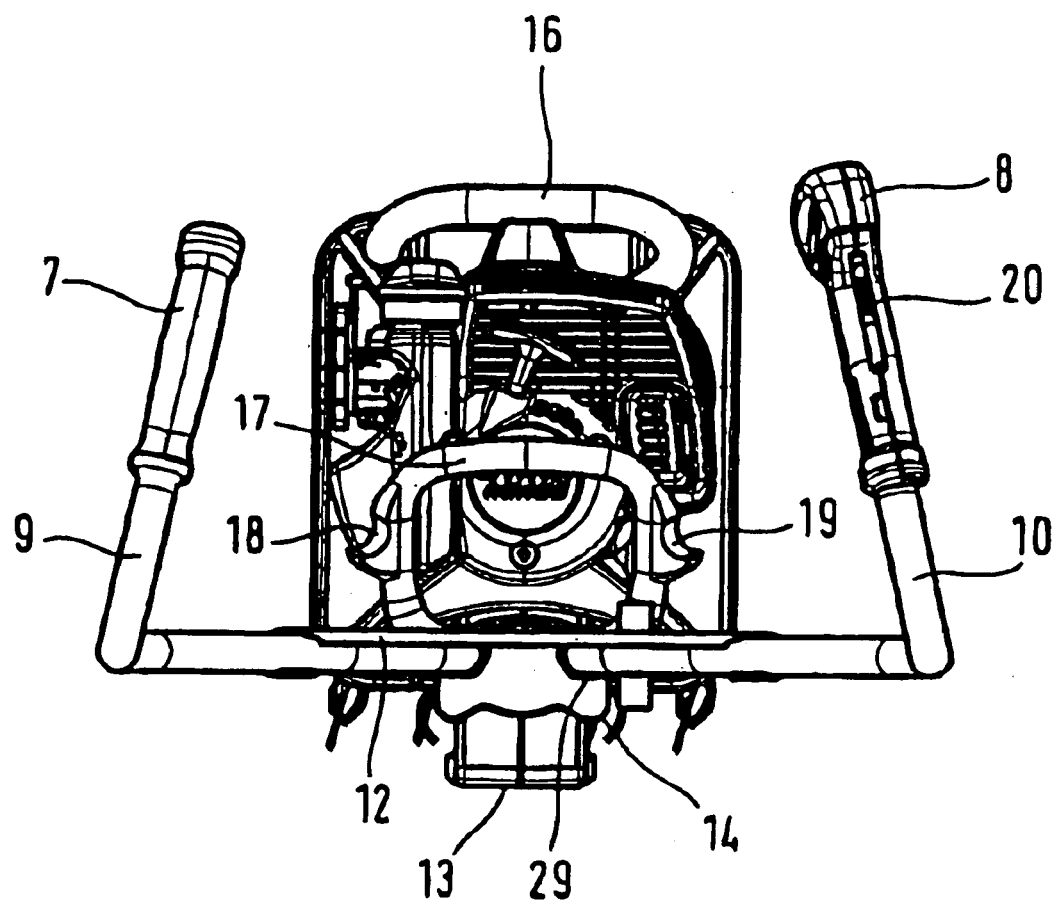
FIG. 4 is a side elevation view of the motorized cultivator viewed in the direction of arrow IV of FIG. 2.

At the end 23 of the frame 2 facing away from the mount 27, a left handle tube 9 and a right handle tube 10 are fixed via a fixing or locking device 11 on the rod 26. A left handle 7 is arranged on the left handle tube 9 and a right handle 8 is arranged on the right handle tube 10. The two handle tubes (9, 10) enclose an intermediate space 24 which is open toward the operator, that is, on the end facing away from the frame 2. The two handle tubes (9, 10) together with the rod 26 form a Y-shaped element as shown in FIG. 3. As shown in FIG. 1, the handles 7 and 8 face away upwardly from the ground surface 42 in the work position of the cultivator 1 and are inclined relative to the effective direction 41 of the gravity force toward the direction of the cultivator blade units 4. As shown in FIG. 4, the two handles (7, 8) run toward each other upwardly in direction, that is, in the direction opposite to the effective direction 41 of the gravity force. The two handle tubes (9, 10) are connected to each other by a transverse strut 12.

Figure 2:
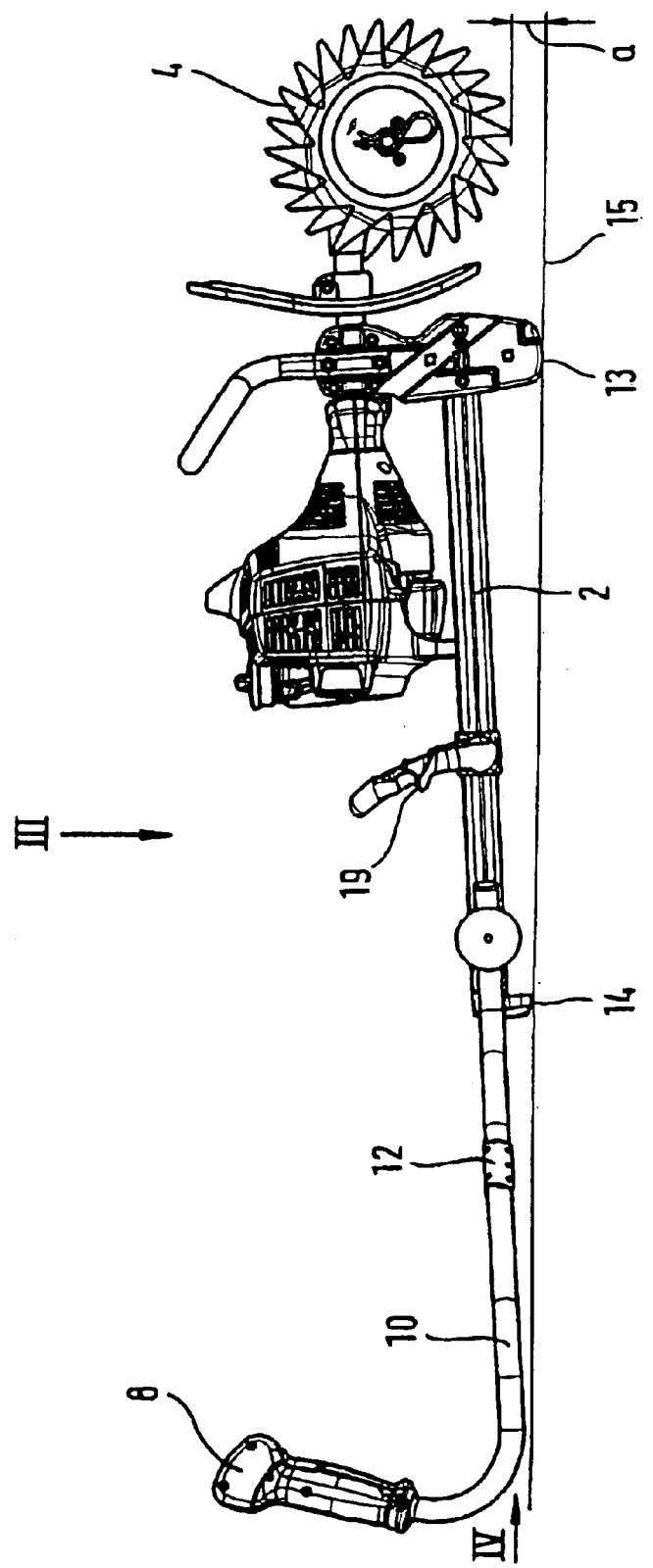
FIG. 2 is a side elevation view of the motorized cultivator of FIG. 1 in a position where it is placed on the ground.

A rearward support 14 is arranged on the frame 2 at the end 23 facing toward the handles 7 and 8. As shown in FIG. 4, a support 29 is formed opposite the support 14. The handle tubes 9 and 10 lie against the support 29. A forward support 13 is formed on the frame 2 in the region of the mount 27. As shown in FIG. 2, the forward support 13 is at a greater spacing from the frame 2 than the rearward support 14. The connecting line of the forward support 13 and the rearward support 14 is at a distance (a) from the cultivator blade units 4. This connecting line corresponds to the ground or floor when the motorized cultivator 1 is placed on the ground. A rearward handle 17 is arranged on the frame 2 between the drive motor 3 and the end 23. This rearward handle 17 has the form of a closed bracket. As specially shown in FIG. 4, the rearward handle 17 has lateral supports (18, 19). Operator-controlled levers 20 are arranged on the handle 8.

Figure 5:
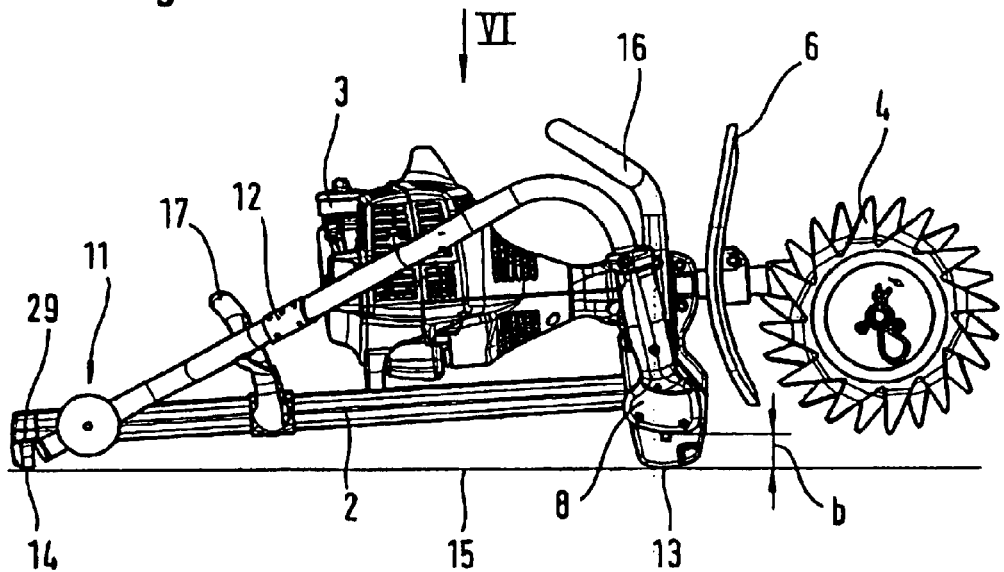
FIG. 5 shows the motorized cultivator of FIGS. 1 to 4 in a side elevation view with the handle tubes folded over.
Figure 6:
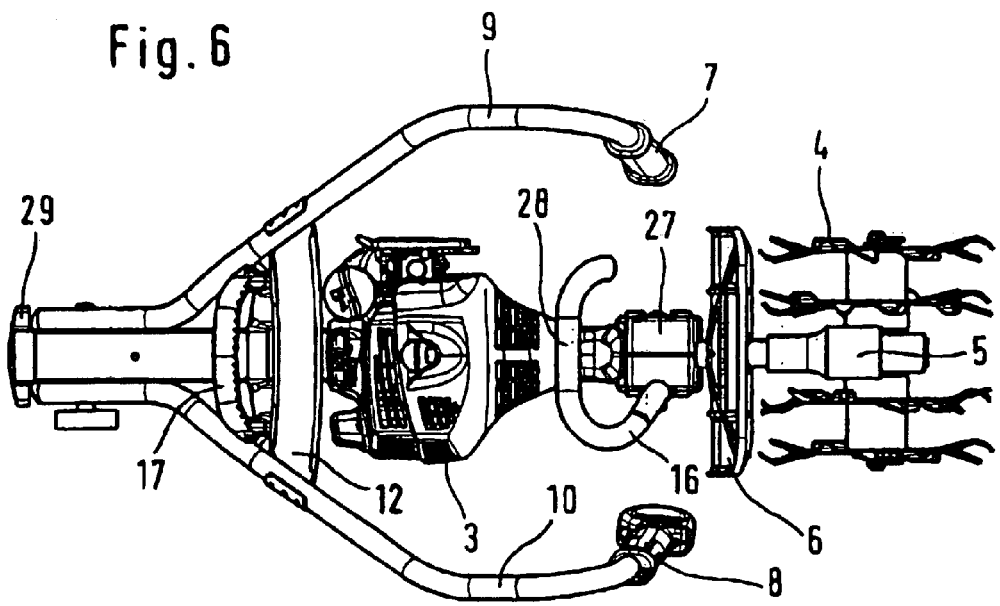
FIG. 6 is a plan view of the motorized cultivator viewed in the direction of arrow VI in FIG. 5.
Figure 7:
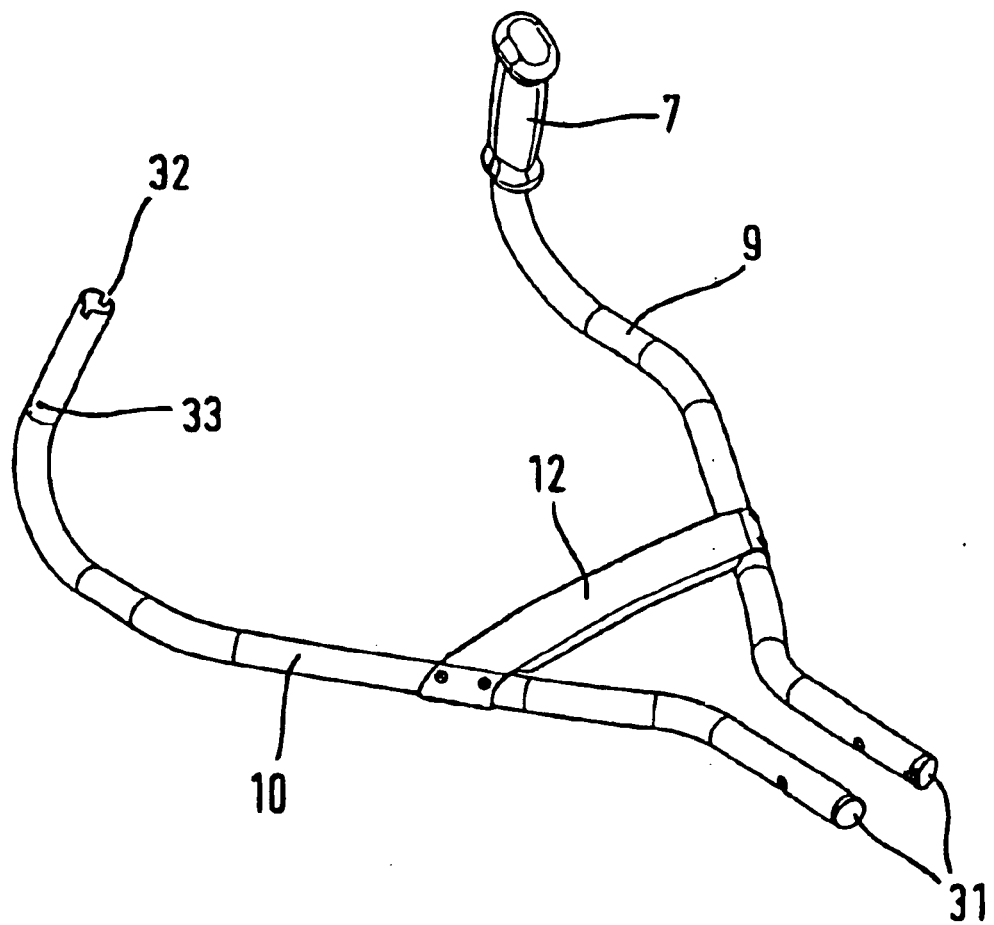
FIG. 7 is a perspective view of the handle bracket.

The handle tubes 9 and 10 are connected to the frame 2 by a fixing or locking device 11. The locking device 11 makes it possible to fold over the handle tubes 9 and 10 about the folding axis 30 (see FIG. 3) and into the folded position shown in FIGS. 5 and 6. In the folded-over position, the handle tubes 9 and 10 lie in the lateral supports 18 and 19, respectively. The handles 7 and 8 are arranged on both sides of the frame 2 approximately at the elevation of the mount 27. As shown in FIG. 5, the handles 7 and 8 are at a distance (b) to the connecting line 15, that is, to the ground surface 42, for example. The transverse strut 12 is arranged between the rearward handle 17 and the drive motor 3. The forward handle acts at the center of gravity of the motorized cultivator 1 in the collapsed or folded position.

The handle tubes 9 and 10 are shown in detail in FIGS. 7 to 15. The handle tubes 9 and 10 are bent from hollow tubes, for example, made of aluminum. The handle tubes 9 and 10 have end caps 31 on the ends facing toward the frame 2. The right handle 8 is not shown in FIGS. 7 to 9. In the region of the handle 8, the right handle tube 10 has end slots 32 for position fixing as well as a bore 33 at which the handle 8 can be fixed to the right handle tube 10. The strut 12 is formed from planar sheet metal which is bent over at its edges as shown, in section, in FIG. 10. The transverse strut 12 is fixed to the handle tubes 9 and 10 by respective sets of five blind rivets 34. As shown in FIG. 11, the handles 7 and 8 are arranged on the handle tubes rotated about their longitudinal axes 35. The handle 7 is rotated through an angle γ relative to the longitudinal direction 21 of the cultivator. The angle γ lies in the range of approximately 5° to 20°. The handle 7 is rotated in the clockwise direction and the handle 8 is rotated in the counterclockwise direction symmetrically to handle 7.

FIGS. 12 to 15 show the left handle tube 9 in detail. In the region of the locking device 11, the left handle tube 9 has a bore 36 on the end facing toward the right handle tube 10 as well as a square opening 37 on the opposite-lying end. The square opening 37 makes possible the form-tight fixing of the handle tubes 9 and 10 in the work position. The left handle tube 9 is formed of the following: an attachment region 38, which runs in the longitudinal direction 21, a center portion 39 which is inclined relative to this attachment region; and, a grasping region 40. The center portion 39 is bent outwardly at an angle δ relative to the attachment region 38. The angle δ lies in the range of between 25° to 45°. The handle region 40 first runs parallel to the attachment region 38 and is inclined at that end, at which the handle 7 is fixed, by an angle β as well as an angle α relative to the plane 25 defined by the two handle tubes 9 and 10. The angle β is that angle, which is measured in the longitudinal direction 21, and lies in a range of 60° to 100°, especially in the range of 70° to 80°. The angle α is measured perpendicular to the longitudinal direction 21 and advantageously amounts to 60° to 85°, especially 70° to 80°. The right handle tube 10 is configured to be symmetrical to the left handle tube 9.

It is understood that the foregoing description is that of the preferred embodiments of the invention and that various changes and modifications may be made thereto without departing from the spirit and scope of the invention as defined in the appended claims.

What is claimed is:

1. A portable, hand-guided work apparatus defining a longitudinal axis and comprising:

a frame extending substantially in the direction of said longitudinal axis;

said frame having a first end and a second end lying opposite said first end;

an assembly including: a drive motor and a work tool driven by said drive motor and said assembly being fixed on said frame at said first end;

a handle unit mounted on said second end for guiding said work apparatus during operation thereof with said work tool being in contact engagement with the surface of the earth to be worked by said work tool thereby defining a work position of said work apparatus;

said handle unit including two handles and two symmetrically configured handle tubes;

said two handles being mounted on respective ones of said handle tubes and being separate from each other; and, said two handles being configured so as to be directed upwardly and away from said surface when said work apparatus is in said work position thereof.

2. The work apparatus of claim 1, wherein said two handles have a clear space therebetween and run upwardly toward each other when said work apparatus is in said work position.

3. The work apparatus of claim 2, wherein said two handles are inclined in a direction toward said work tool when said work apparatus is in said work position.

4. The work apparatus of claim 1, wherein said handle tubes conjointly define an enclosed intermediate space open to an operator of said work apparatus.

5. The work apparatus of claim 4, wherein said handle tubes are pivotally mounted on said frame; and, wherein said work apparatus further comprises means for receiving and releasably holding said handle tubes when they are pivoted or folded over on said frame.

6. The work apparatus of claim 5, wherein said handle tubes are disposed on corresponding sides of said frame when said handle tubes are folded over.

7. The work apparatus of claim 6, further comprising a rearward carrying handle mounted on the side of said frame facing toward said handle unit.

8. The work apparatus of claim 7, further comprising a forward handle mounted in a region between said drive motor and said work tool.

9. The work apparatus of claim 8, wherein said forward handle lies approximately at the center of gravity when said handle tubes are folded over.

10. The work apparatus of claim 9, wherein said means for receiving and holding said handle tubes comprises lateral supports in which said handle tubes lie when said handle tubes are folded over.

11. The work apparatus of claim 10, further comprising a transverse strut connecting said handle tubes to each other; and, said transverse strut lying between said rearward handle and said drive motor when said handle tubes are folded over.

12. The work apparatus of claim 11, wherein said handle tubes conjointly define a plane; each of said handles and said plane conjointly define an angle ($\alpha$) perpendicular to said longitudinal axis with said angle ($\alpha$) being in a range of 60° to 85°.

13. The work apparatus of claim 12, wherein said angle ($\alpha$) lies in a range of 70° to 80°.

14. The work apparatus of claim 12, wherein each of said handles and said plane conjointly define an angle ($\beta$) in a range of 60° to 100° in the direction of said longitudinal axis.

15. The work apparatus of claim 14, wherein said angle ($\beta$) lies in a range of 70° to 80°.

16. The work apparatus of claim 1, wherein said frame has a forward support and a rearward support; and, said forward support and said rearward support define an imaginary line running at a distance ($\alpha$) from said work tool.

17. The work apparatus of claim 1, wherein said work apparatus is a motor-driven cultivator.

18. A portable, hand-guided work apparatus defining a longitudinal axis and comprising:

a frame extending substantially in the direction of said longitudinal axis;

said frame having a first end and a second end lying opposite said first end;

an assembly including: a drive motor and a work tool driven by said drive motor and said drive motor of said assembly being fixedly mounted on said frame at said first end;

a handle unit mounted on said second end for guiding said work apparatus during operation thereof with said work tool being in contact engagement with the surface of the earth to be worked by said work tool thereby defining a work position of said work apparatus;

said handle unit including two handles and two symmetrically configured handle tubes;

said two handles being mounted on respective ones of said handle tubes;

said two handles being configured so as to be directed upwardly and away from said surface when said work apparatus is in said work position thereof; and, said motor having a drive shaft extending outwardly beyond said first end of said frame and said work tool being carried by said drive shaft for performing said work in the earth and to define the sole support on the ground of said work apparatus during operational use thereof.

19. The work apparatus of claim 18, wherein said two handles are inclined in a direction toward said work tool when said work apparatus is in said work position.

20. The work apparatus of claim 19, wherein said handle tubes conjointly define an enclosed intermediate space open to an operator of said work apparatus so as to permit the operator to enter said space with said handles being at respective sides of the operator.

* * * * *

UNITED STATES PATENT AND TRADEMARK OFFICE
CERTIFICATE OF CORRECTION

PATENT NO. : 6,904,977 B2
DATED : June 14, 2005
INVENTOR(S) : Gerhard Zerrer et al.

It is certified that error appears in the above-identified patent and that said Letters Patent is hereby corrected as shown below:

Column 6,
Line 12, delete "($\alpha$)" and substitute -- (a) -- therefor.

Signed and Sealed this

Sixteenth Day of August, 2005

JON W. DUDAS
*Director of the United States Patent and Trademark Office*